United States Patent [19]

Wong

[11] 3,747,099

[45] July 17, 1973

[54] POLYPHASE CODE SYSTEM

[75] Inventor: Sung Y. Wong, Tarzana, Calif.

[73] Assignee: Hughes Aircraft Company, Culver City, Calif.

[22] Filed: Sept. 18, 1970

[21] Appl. No.: 73,471

[52] U.S. Cl. ............ 343/17.2 PC, 178/67, 325/320

[51] Int. Cl. ............ G01s 9/233

[58] Field of Search ............ 343/17.1 R, 17.2 R, 343/17.2 PC; 178/67; 325/320

[56] References Cited

UNITED STATES PATENTS

| | | | |
|---|---|---|---|
| 3,675,129 | 7/1972 | Melvin | 325/320 |
| 3,663,935 | 5/1972 | MacMullen | 343/17.2 PC X |

*Primary Examiner*—T. H. Tubbesing

*Attorney*—James K. Haskell and Lawrence V. Link, Jr.

[57] ABSTRACT

A system for polyphase encoding transmitted pulses of energy and for decoding the received signals to enhance returns from the range interval being examined during a particular processing period and attenuate returns from contiguous range intervals (pulse compression). The system includes a digital decoding unit, which for an N phase code of length $N^2$, comprises N processing subsections. The subsections are mechanized such that instead of individually phase shifting and adding each of the $N^2$ signals during each decoding sequence, the decoded value of a signal group being processed is formed by modifying and phase shifting only the N subsection output signals from the preceding decoding cycle.

21 Claims, 16 Drawing Figures

Sung Y. Wong,
INVENTOR.
BY.

Lawrence V. Link Jr.
ATTORNEY

POLYPHASE CODE SYSTEM

BACKGROUND OF THE INVENTION

This invention relates generally to polyphase code systems and more particularly to digital systems having reduced complexity for coding and decoding sequences of polyphase encoded signals.

In applications such as radar mapping and ranging, it is theoretically possible to achieve any desired range resolution by transmitting a sufficiently narrow pulse of energy and then processing the received energy in a receiver unit of suitable bandwidth. Following this approach, as the pulsewidth decreases the peak power of the transmitted signal must be increased if a given range capability is to be maintained. For many applications the combined range and range resolution requirements would require a narrow pulse of such peak power as to exceed the current stage of the pulse transmission art.

The above-described problem prompted the development of pulse compression techniques wherein a fairly long (time duration) low peak power encoded pulse is transmitted, and on reception the received signal is decoded (time compressed). Numerous analog techniques for pulse compression have been developed such as those using tapped delay lines or dispersive delay devices. These analog systems although exhibiting various degrees of effectiveness have all suffered from the common shortcomings of analog mechanizations, i.e., stability, size, weight, power and cost disadvantages as contrasted to their digital counterparts.

Heretofore the development of digital decoding systems for polyphase encoded signals was retarded because for a code of N phase states and length $N^2$, $N^2$ complex multiplications (vectorial phase shifts) and $N^2$ complex additions (signal phase as well as amplitude being processed) would be required for each code sequence processed. For applications such as radar ranging and mapping where thousands of range intervals are examined each transmission period $N^2$ complex additions per range interval would make a digital decoder economically unattractive.

SUMMARY OF THE INVENTION

It is therefore an object of this invention to provide an improved polyphase pulse compression system. Another object is to provide a digital system of reduced complexity for sequentially decoding a plurality of polyphase encoded signal groups.

A more specific object is to provide a digital decoding unit which substantially reduces the number of arithmetic operations and the equipment complexity required for decoding polyphase encoded signal groups.

A still further object is to provide an improved digital decoding unit which processes an encoded received radar signal in such a manner as to provide improved range resolution.

Briefly described, the subject invention involves the apparatus and method for digitally decoding groups of signals encoded according to a code of N phase states with each encoded group comprising $N^2$ signals. The decoding unit includes N subsections with each subsection providing an output signal (sub-accumulation signal) representative of the sum of N phase rotated encoded signals. The sum of the N sub-accumulation signals produced during a particular processing time period approximates the decoded value of the signal group associated therewith. The output signals from the same subsection are functionally related for consecutive encoded signal groups and an iterative arithmetic mechanization may be utilized. Hence, instead of phase shifting and then summing each signal of each code group, the subject decoder modifies the N sub-accumulation signals associated with the last processed code group to compensate for the change between encoded signal groups, and these modified (updated) output signals are then individually phase shifted to form N sub-accumulation signals associated with the next code group. This above-described recursive operation substantially reduces the required number of arithmetic operations and hence the equipment complexity.

In one preferred embodiment of the subject invention, each of the N subsections includes digital circuits for vectorially (both inphase and quadrature components of the signals are processed) adding a new signal and subtracting a previous entry from each of the N sub-accumulation signals associated with the last decoded signal group. Means are provided for storing these modified sub-accumulation signals and each subsection further includes a complex multiplication unit for forming the vectorial product of the associated modified sub-accumulation signal and a preselected vector multiplier value (i.e., incremental phase shifts are applied to each of the modified output signals of the previous cycle). N stage shift registers coupled between the subsections, provide the correct propagation of data within the decoder unit.

The radar ranging and mapping applications, the adverse effect on the decoded received signal due to interference from signals from contiguous range intervals is reduced by a digital weighting network coupled to the output of the decoder unit. The weighting network modifies the decoded signal for each range interval as a function of the value of the signal from the range interval both preceding and following the one being processed.

BRIEF DESCRIPTION OF THE DRAWINGS

The novel features of this invention, as well as the invention itself, will be better understood from the accompanying description taken in connection with the accompanying drawings in which like reference characters refer to like parts and in which.

Figures 1, 2, 3:
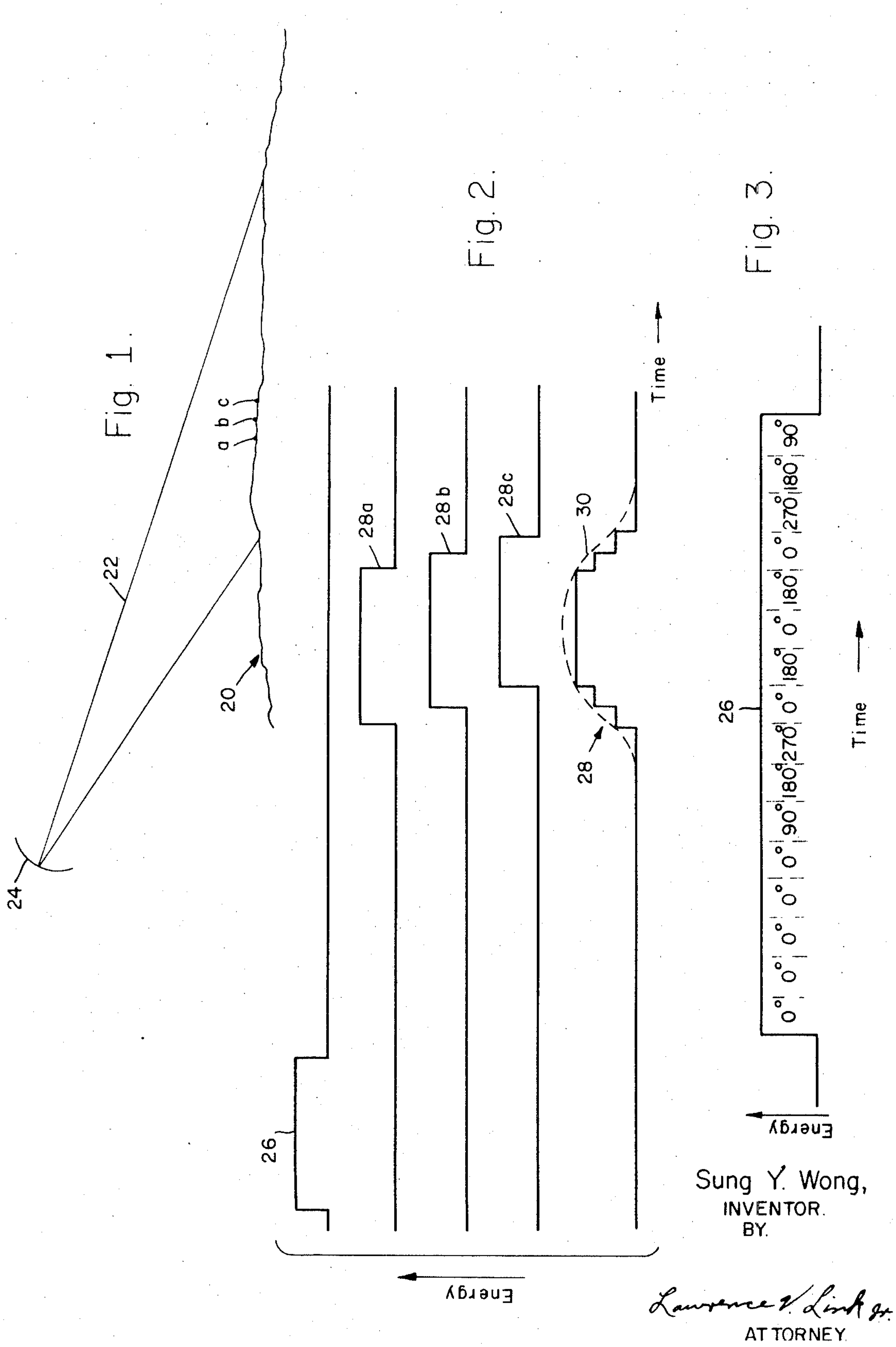
FIG. 1 depicts a group of discrete closely spaced reflectors within the radiation beam of the transmission system of the subject invention and is useful in the explanation of the operation of the invention.
FIG. 2 shows waveforms of a transmitted signal pulse, received signals from each of the reflectors of FIG. 1, and a composite signal received from the three reflectors.
FIG. 3 depicts the relative phase shift within a transmitted pulse for a simplified code of four encoded states and 16 elements.
Figure 11:
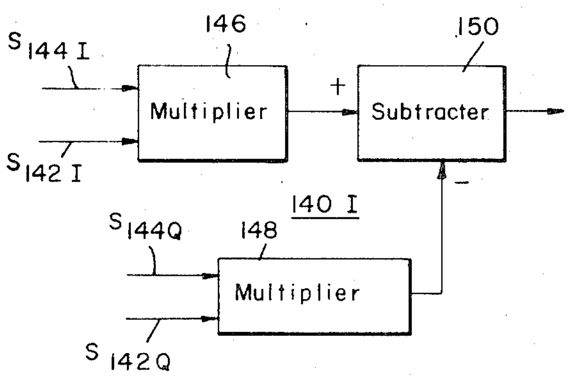
Figure 12:
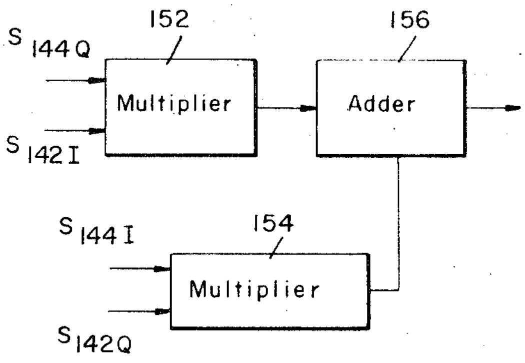
Figures 4, 13:
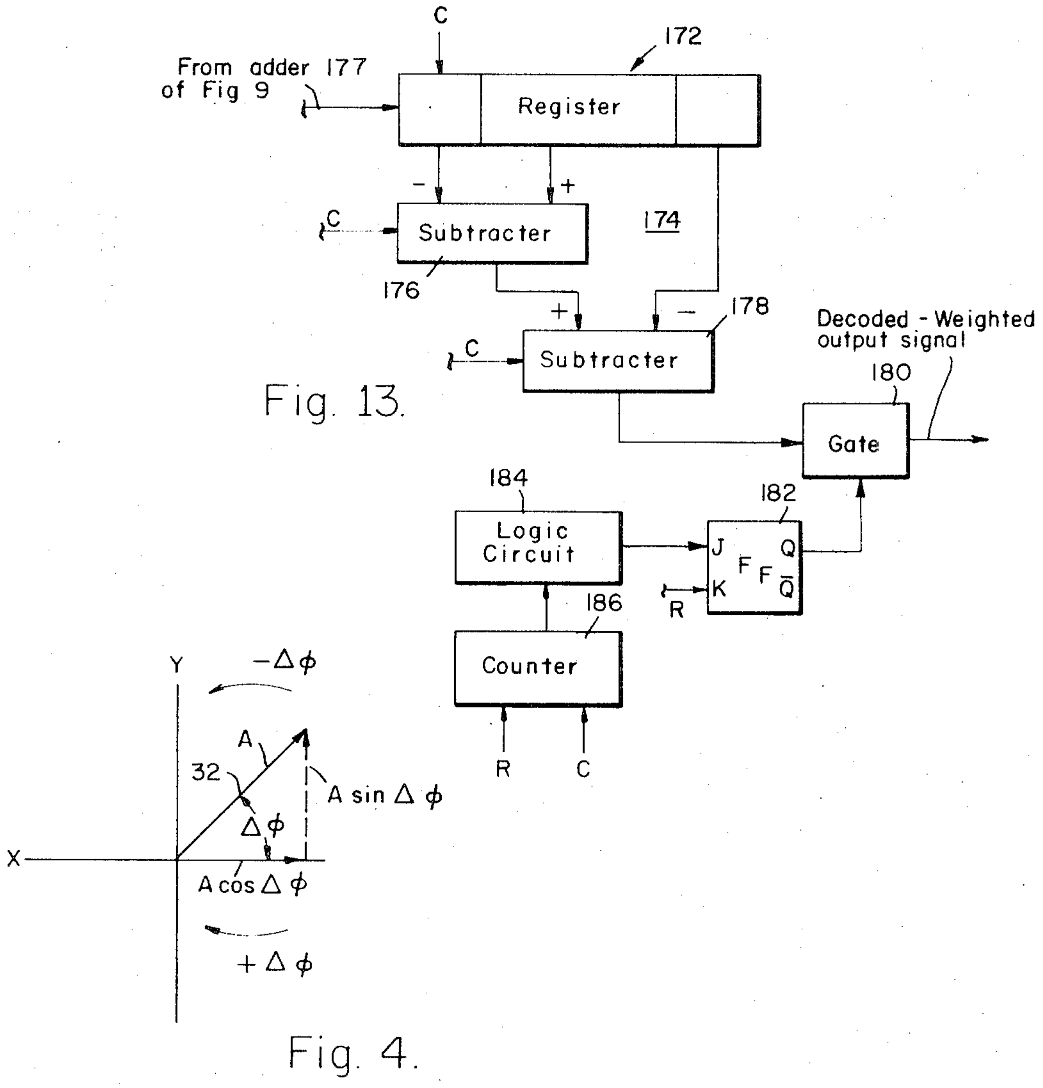
FIG. 4 is a vector diagram for explaining the vectorial symbology adapted herein.
Figure 6:
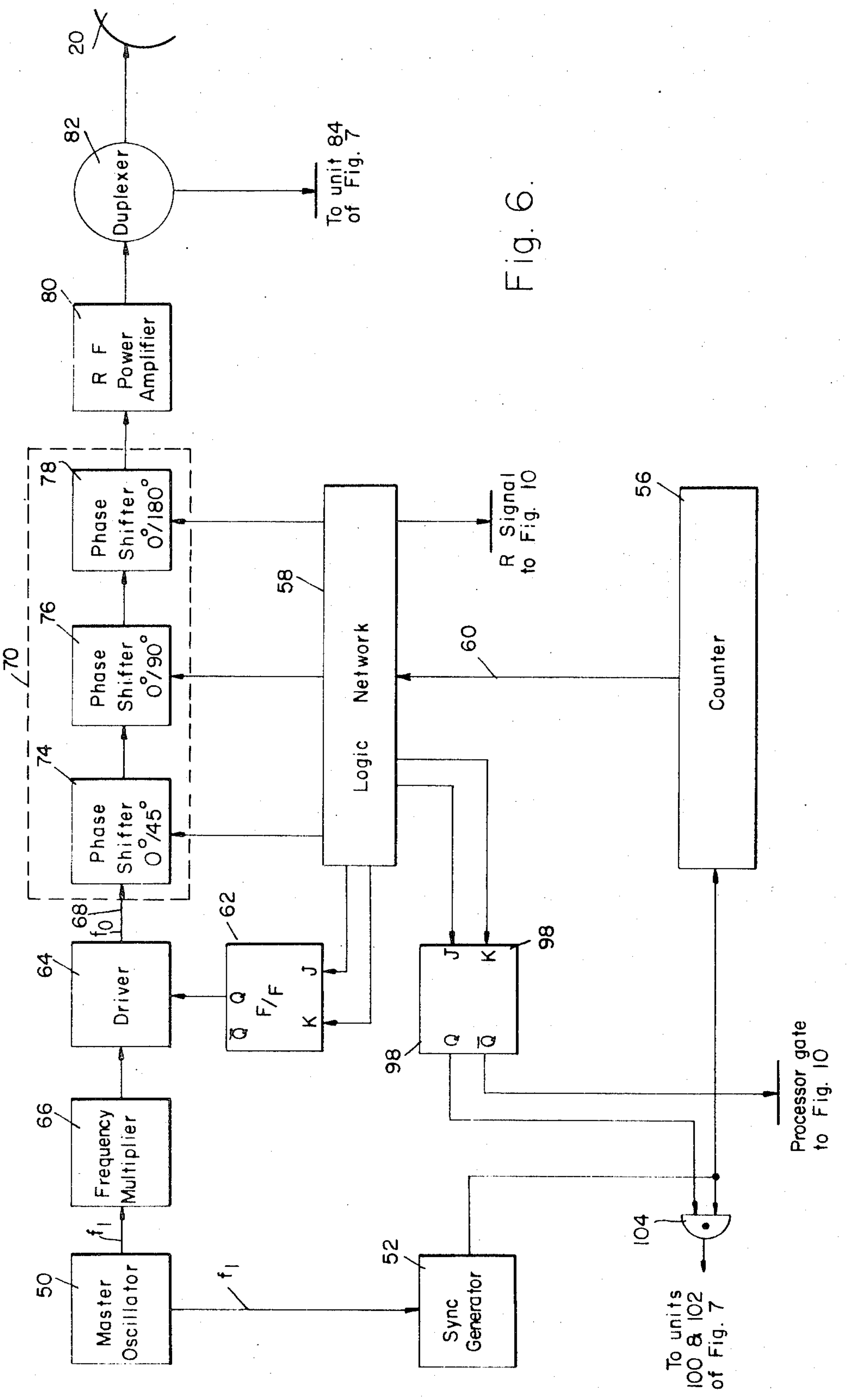
Figure 7:
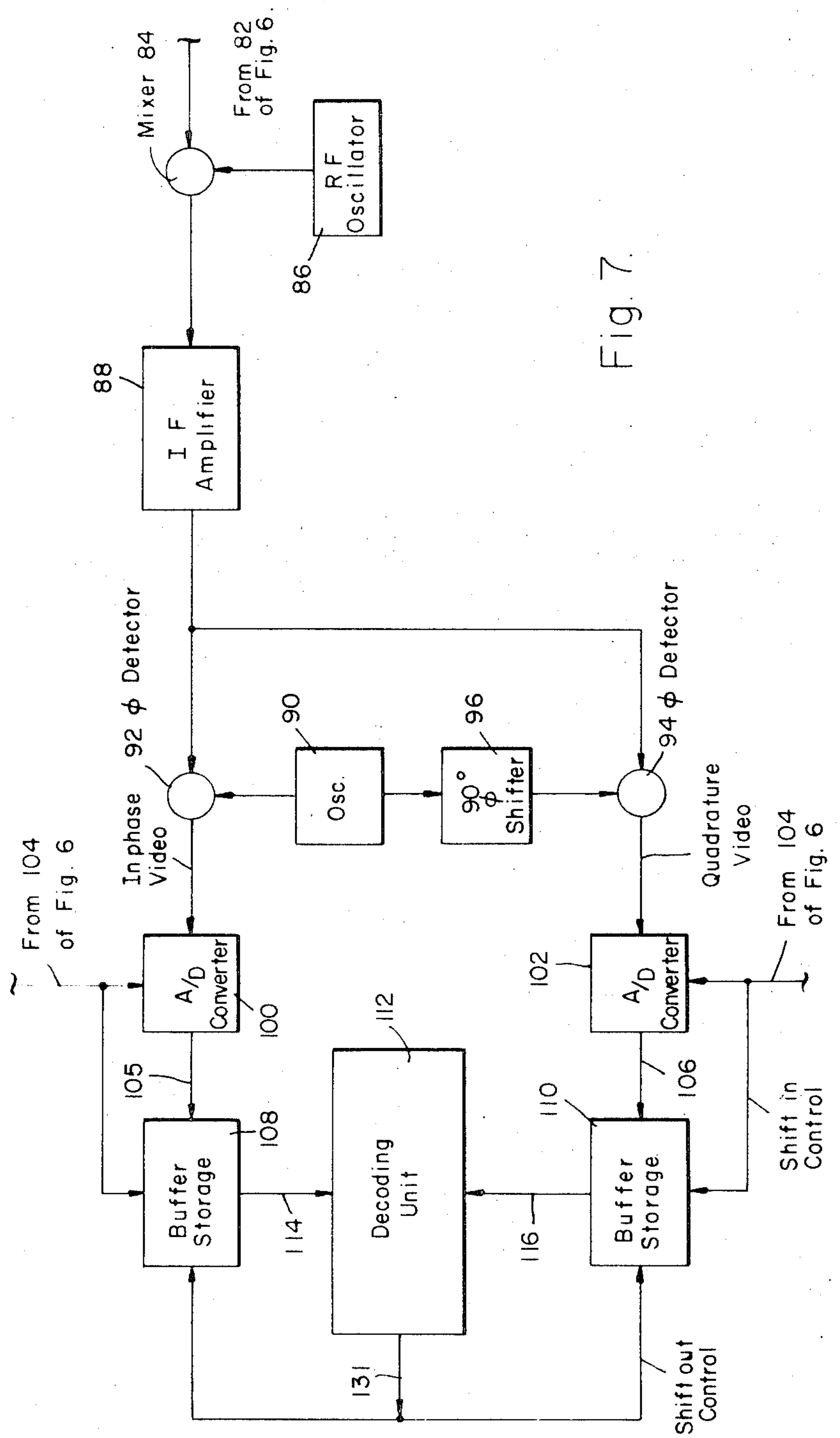
Figure 8:
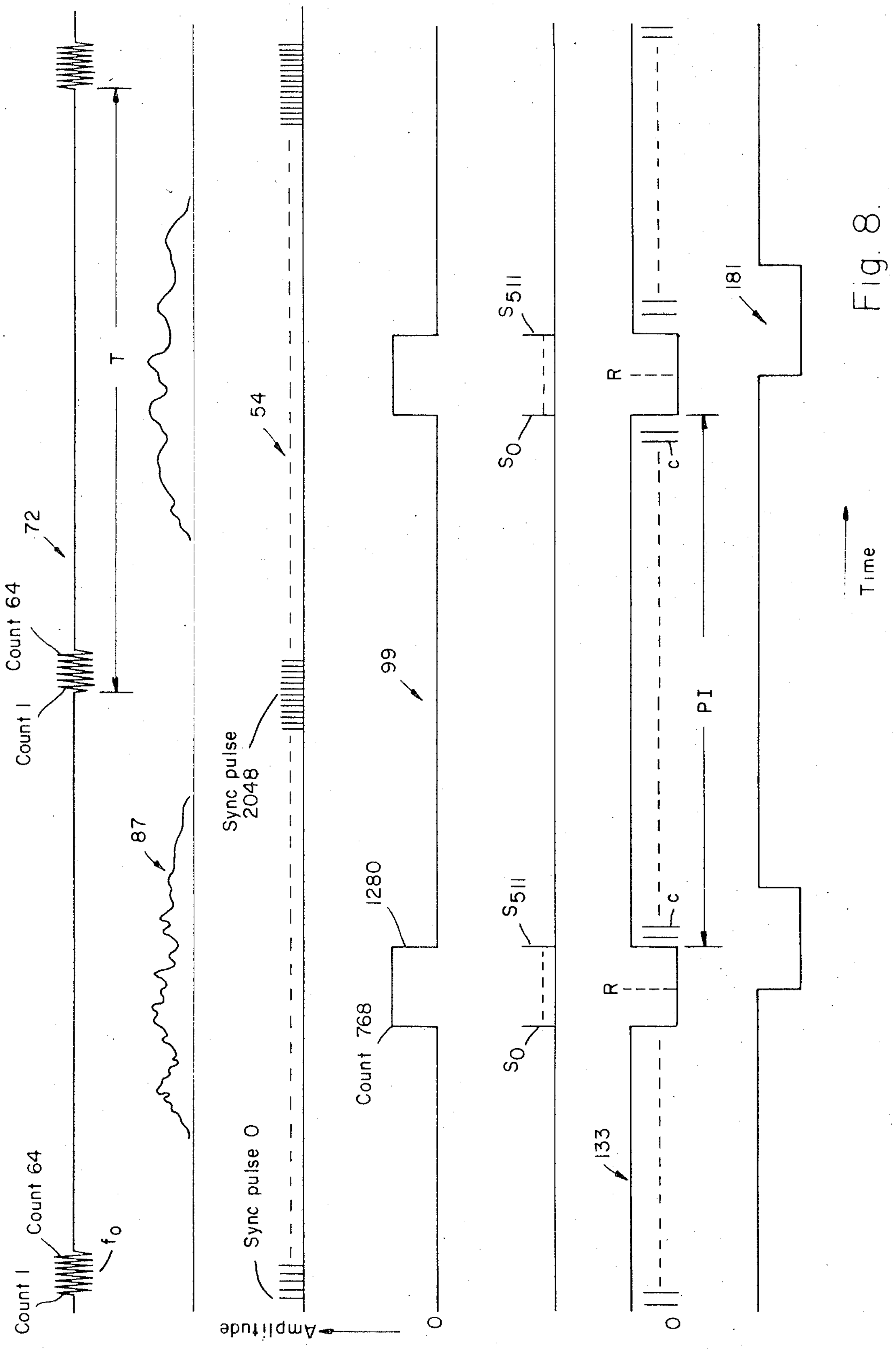
Figure 9:
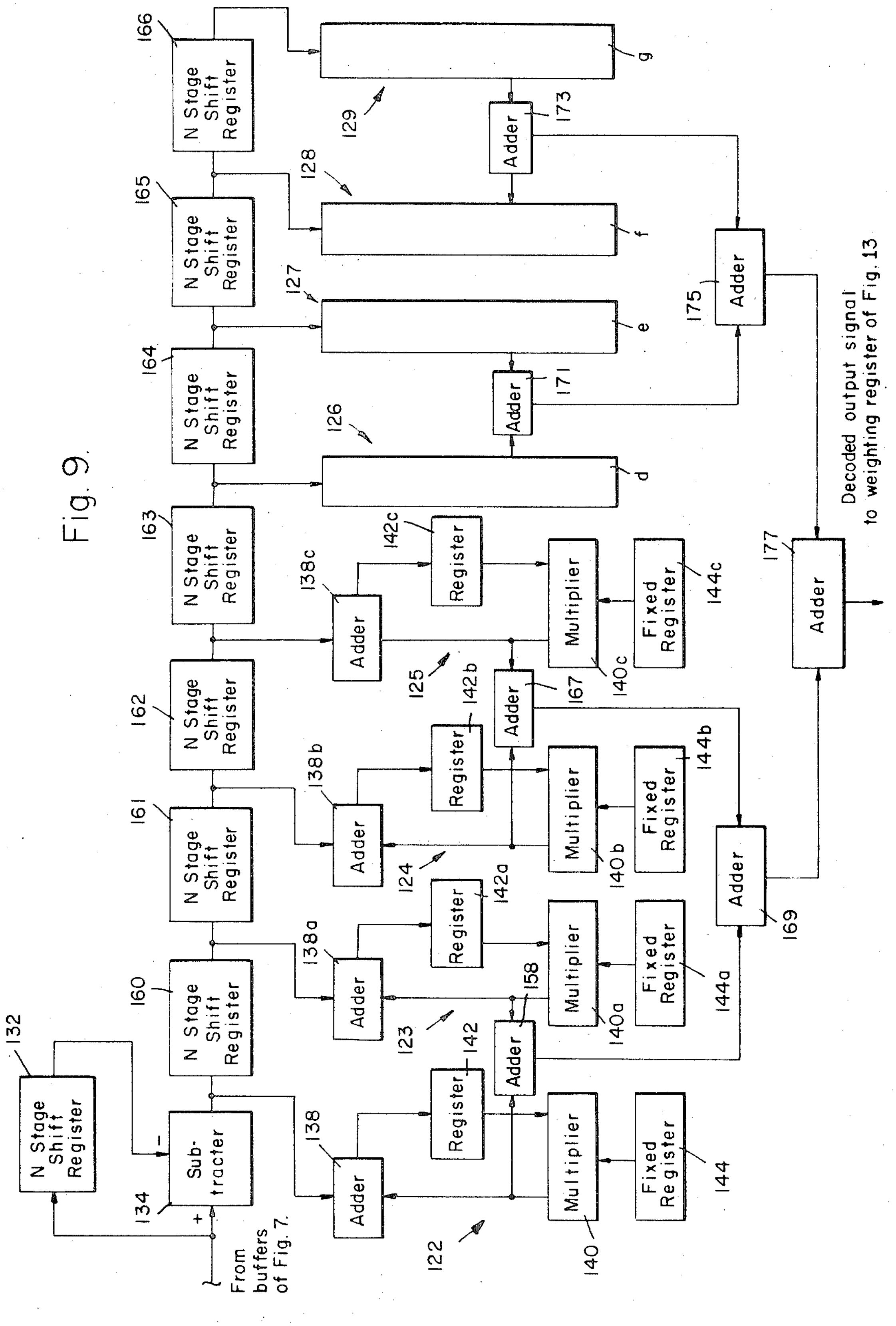
Figure 10:
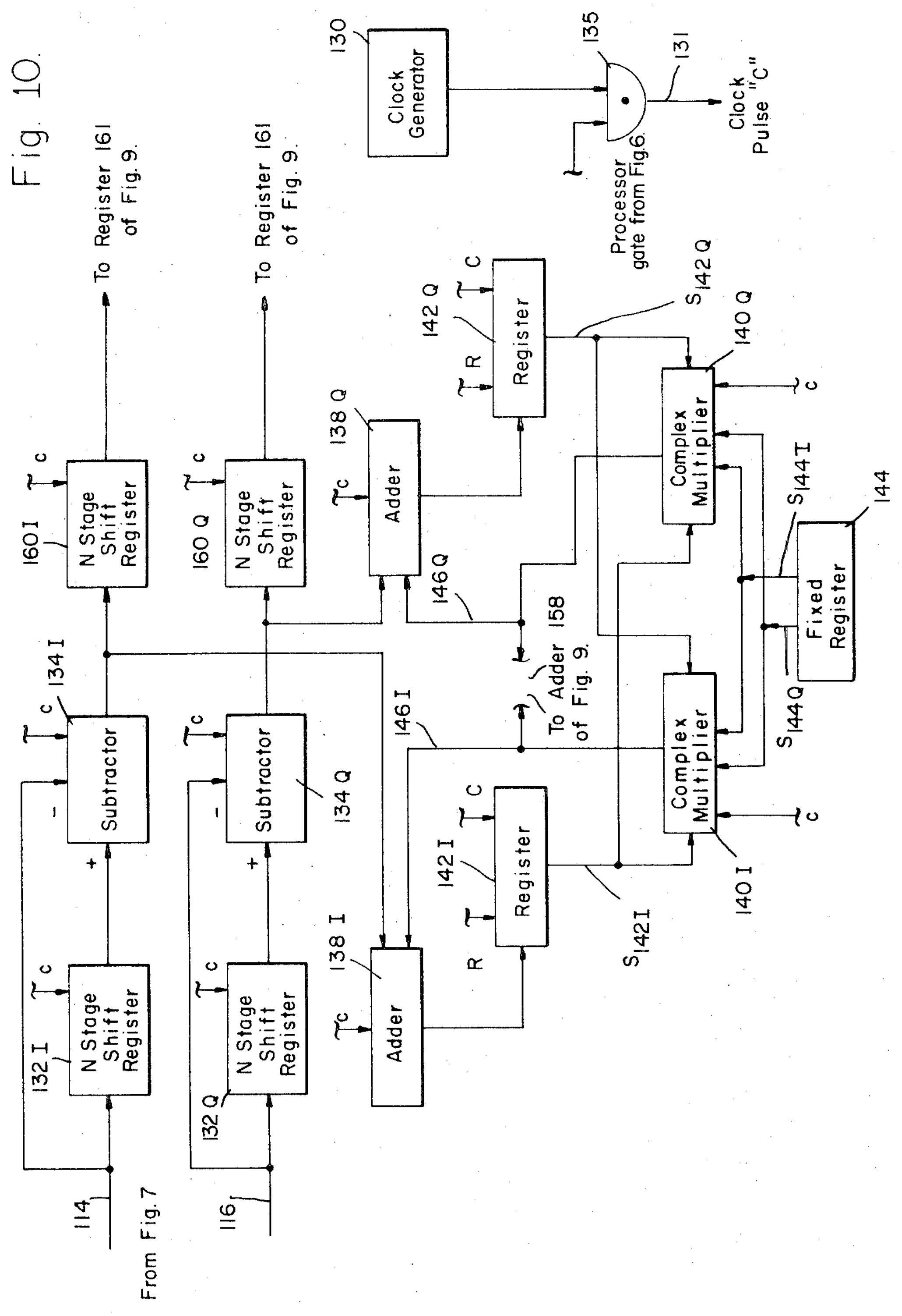
Figure 14:
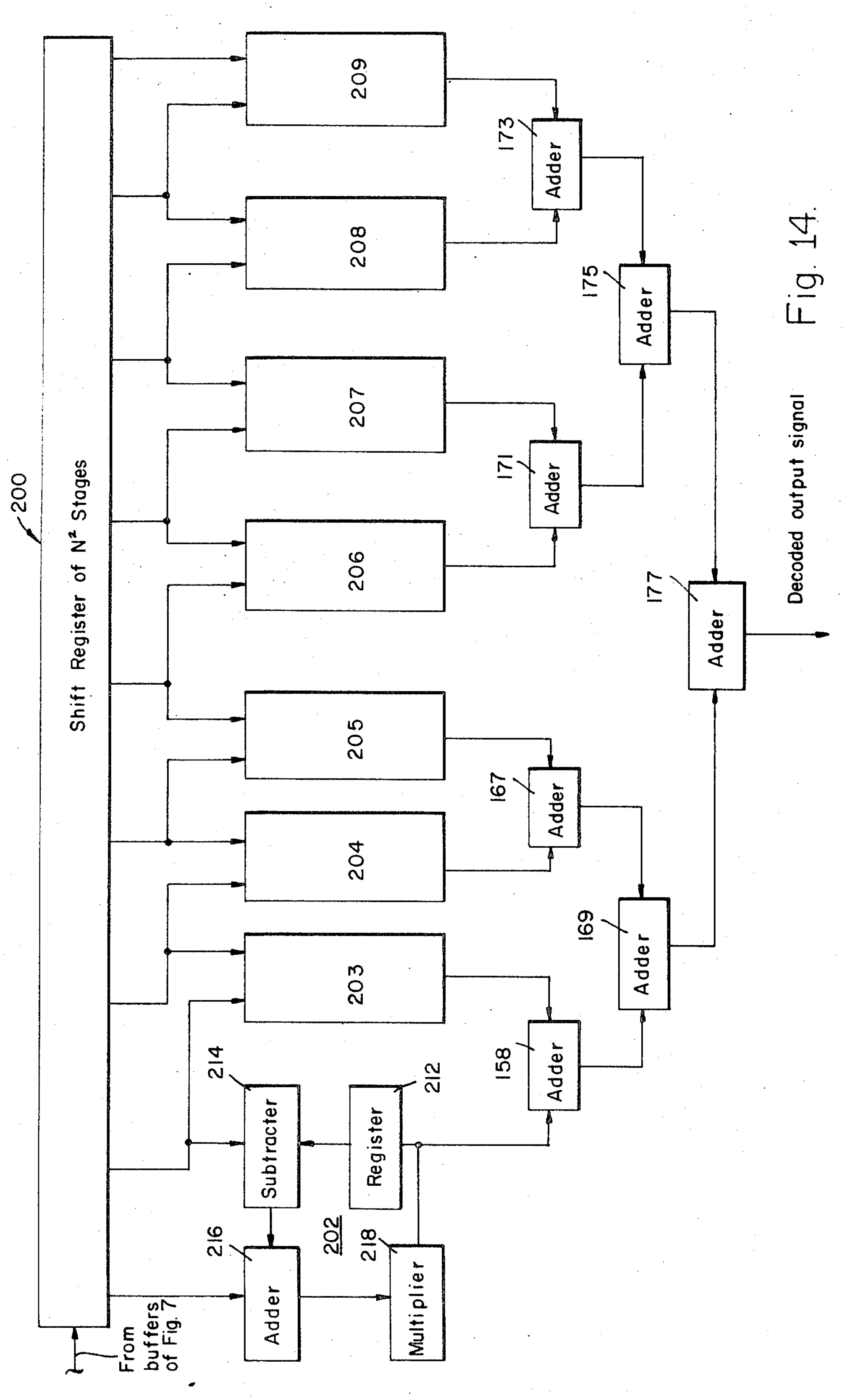

FIGS. *5a*, *5b* and *5c* illustrate a simplified decoding sequence for the signals from each of the reflectors of FIG. 1 for the purpose of assisting in the visualization of the pulse compression effect derived from polyphase encoded signals;

FIG. 6 is a block diagram of a system for transmitting a polyphase encoded signal in accordance with the principles of the invention;

FIG. 7 is a block diagram of a receiver for processing the received reflected energy in accordance with the principles of the invention;

FIG. 8 is a graph of timing waveforms useful in the explanation of the operation of the disclosed system;

FIG. 9 is a block diagram of one preferred embodiment of a decoding system included in the receiver of FIG. 7 in accordance with the subject invention;

FIG. 10 is a more detailed block diagram of a portion of the decoding system of FIG. 9;

FIGS. 11 and 12 are block diagrams of vector multiplier units which may be utilized in the decoder system of FIG. 9;

FIG. 13 is a block diagram of a weighting network for reducing the "spectral sidelobes" of the decoded signal; and FIG. 14 is a block diagram of a second preferred embodiment of a decoding system in accordance with the subject invention.

DESCRIPTION OF THE PREFERRED EMBODIMENT

The subject invention may be better understood by first discussing polyphase code techniques and a pulse compression application requiring the decoding of consecutive groups of encoded signals.

FIG. 1 shows in greatly simplified terms one such application wherein the terrain 20 includes closely spaced reflector elements *a*, *b* and *c* within the pattern 22 of an antenna 24. If it is assumed that the transmitted energy pulse is as shown by a waveform 26 in FIG. 2, waveforms 28*a*, 28*b* and 28*c* of FIG. 2 show the return signal from the reflectors of FIG. 1 designated by the same letter; and waveform 28 the composite received video signal. Dashed line 30 depicts the shape of signal 28 after processing by a receiver of limited bandwidth, and as may be seen from envelope 30 the range of the individual reflectors could not be determined simply from the amplitude of the composite signal 28.

If the transmitted pulse 26 were first phase encoded with a suitable code, range resolution may be greatly enhanced and by way of example the transmitted pulse 26 is shown at an expanded time scale in FIG. 3 as encoded by a "Frank" code having four phase states and 16 encoded elements. The "Frank" code is well known in the art and will be discussed in greater detail hereinafter. The phase encoded on each of the elements within pulse 26 is indicated in the FIG. 3 and may be determined from the matrix of Table I as read from left to right progressing from the top to the bottom row.

TABLE I

| | | | |
|---|---|---|---|
| 0 | 0 | 0 | 0 |
| 0 | 90 | 180 | 270 |
| 0 | 180 | 0 | 180 |
| 0 | 270 | 180 | 90 |

Before further proceeding with the explanation of the pulse compression application, the vector symbology adapted herein will first be explained with reference to FIG. 4. The relative phase of the transmitted energy contained within pulse 26 may be represented by vector 32 of length A referenced to an XY coordinate system. The coordinate system (X,Y) is assumed to rotate at an angular frequency $f_o$, equal to the fundamental frequency of the transmitted pulse.

A phase shift $\Delta\phi$ in the transmitted signal relative to the fundamental frequency $f_o$ is shown by the angle between the X axis and the vector; and the vector may be defined by the magnitude of the inphase component along the X axis (A cos $\Delta\phi$) and the imaginary component (A sin $\Delta\phi$) along the Y axis. Sometimes hereinafter such a vector is designated by the notation $A \cos \Delta\phi + j A \sin \Delta\phi$. As indicated in FIG. 4, a clockwise phase rotation has arbitrarily been assigned a positive value while a counterclockwise rotation (phase delay) is designated a negative value. A phase advance of X degrees may be mechanized by phase delay of $2\pi - X$ degrees.

To properly decode a transmitted pulse such as pulse 26 (FIG. 3) a phase rotation equal to but opposite to the phase encoded during transmission is impressed on the received signal (multiplication by the complex conjugate of the encoded value). If the received signal 28 were applied to a shift register such that all the signal elements of the signal reflected from one of the reflectors, such as the reflector *b* for example, were contained within the shift register then the range interval corresponding to the area containing the reflector *b* could be examined by providing the appropriate decoding phase shift.

Figure 5A:
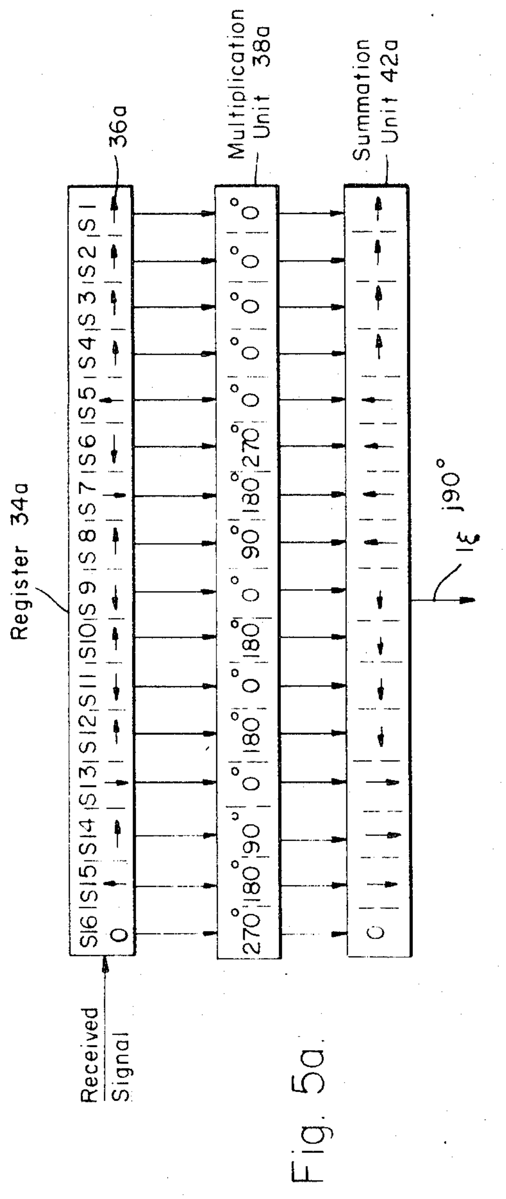
Figure 5B:
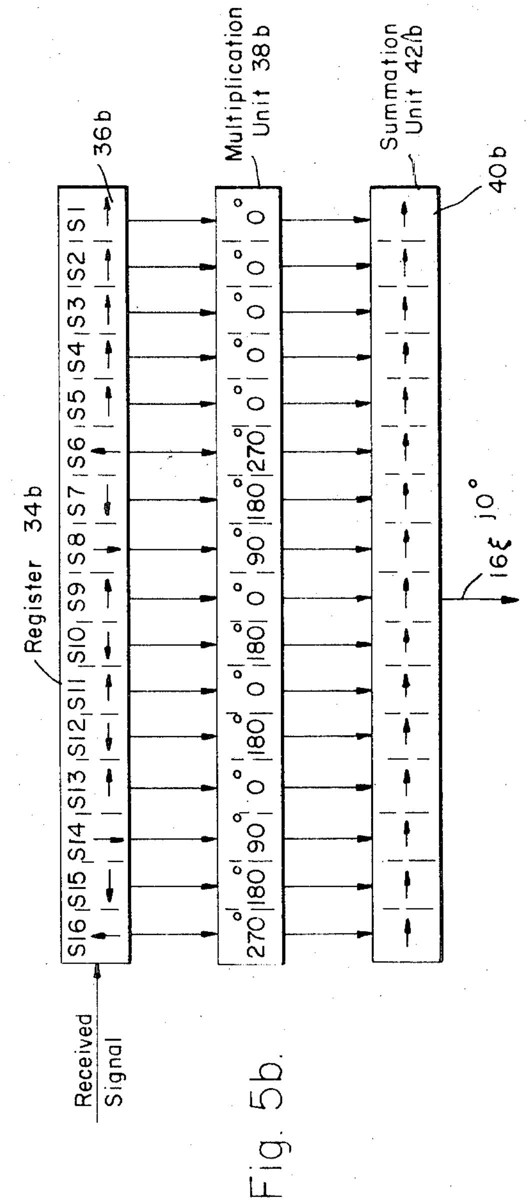
Figure 5C:
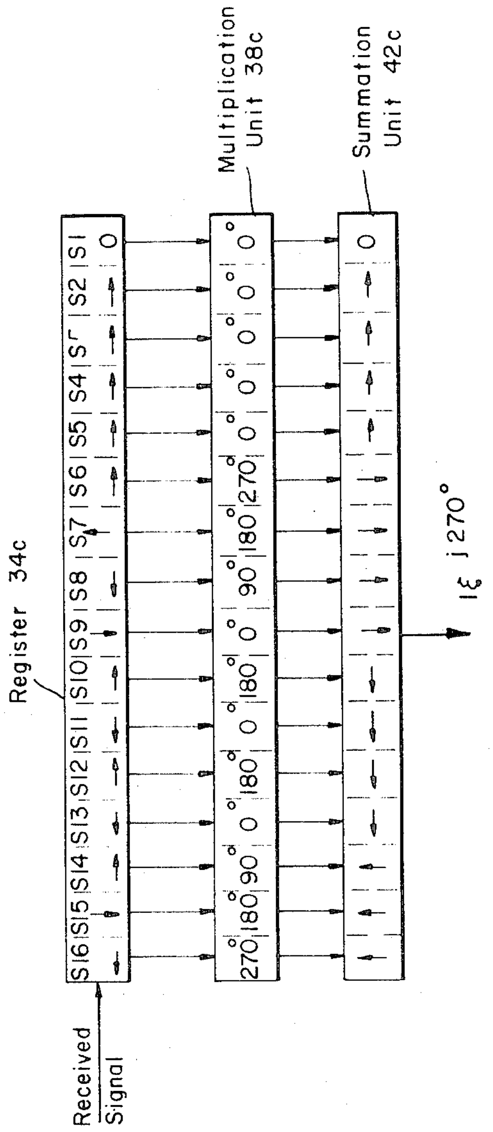

This decoding process may be visualized by referring to FIG. 5*a*, 5*b* and 5*c* wherein each of the returned signals 28*a*, 28*b* and 28*c* respectively are decoded as though they were separately processed. If it is assumed that the signals are processed in a linear manner prior to the decoding step an analysis of each signal separately and a combination of results thereof is indicative of the results of the simultaneous processing of the signals (Superposition Theorem). It is assumed that the signal elements of the received signal 28 are shifted into 16 stage registers 34*a*, 34*b* and 34*c* so that the signal elements associated with each reflector are stored within the correspondingly labeled register. If it is further assumed that at the time of a particular observation the last return element from reflector *b* had been just received, it may be shown that by proper decoding the received energy from reflector b is enhanced while the energy from reflectors *a* and *c* is attenuated. In FIGS. 5*a* – 5*c* the received signal components are illustrated as being separately processed in registers 34*a* – 34*c*, multiplication units 38*a* – 38*c* and summers 42*a* – 42*c* corresponding to the component signal from the respective reflector designated by the same letter — it being understood that in actuality one unit simultaneously processes the composite signal 28.

The signal elements Sthrough $S_{16}$ associated with reflector *b* are shown in FIG. 5*b* as being stored in the register 34*b*. The relative phase of each received signal element is indicated by vector arrows such as arrow 36*b*. To decode the signal group contained in the register 34*b* a phase rotation equal in magnitude but opposite in direction to that impressed upon the transmitted signal is required. This phase rotation may be produced in a complex multiplication unit 36*b* which produces the phase shift indicated therein which is opposite to the phase shift impressed on transmitted signal 26. Complex multiplication units will be described in detail subsequently during the explanation of the decoder unit of FIG. 9.

The output of the multiplication unit 38*b* (phase indicated by arrows such as 40*b*) is applied to a complex summation unit 42*b* and the sum produced by this unit is indicated at the output thereof as a vector with an amplitude 16 times that of each element of the signal 28*b* and at a relative phase angle of zero ($16\epsilon^{jo}$).

It will be noted in FIGS. 5*a*, 5*b* and 5*c* that each element of the same stage (rank) of shift register 34 receives the same phase rotation in the multiplier units 38*a*–38*c*. However, the signals associated with reflectors *a* and *c* are at a different relative position in the registers and are decorrelated whereas the signals from the reflector *b* are centered in the register and are correlated. In regard to this last point, it will be noted that in register 34*a* the signal $S_o$ (the first return from reflector *a* at time $t = 0$) had been shifted out of the register and the entire code is one position to the right of the corresponding elements in register 34*b* with no energy in position $S_{16}$ in register 34*a*. Similarly the code elements in the register 34*c* are each shifted one position to the left of the elements of the register 34*b*. As indicated by the sum values at the outputs of the summation networks 42, the reflected energy from the range interval being correlated (reflector *b*) is enhanced and the energy value from the adjacent uncorrelated range intervals (*a* and *c*) are substantially attenuated.

One of the more important characteristics of a decoding system for utilization in pulse compression applications is the ratio of the signal value originating from reflectors within a particular range interval being examined to the energy received from contiguous range intervals. It is noted that some of the energy in the decoded output signal for a particular range interval not only originates within adjacent range intervals but also some of the energy is received from other range intervals within the equivalent range of the transmitted pulse. As used herein the term sidelobe energy is the sum of the energy present in the output signal for a particular range interval which originated from reflectors located in other range intervals. It may be shown that significant sidelobe energy is produced by signals from the extreme positions of the transmitted pulse equivalent range zone. This is caused by the fact that signals originating from reflectors within the end range zones provide fewer encoded elements in the received signal and decorrelation (phase cancellation) is reduced. As will be explained subsequently, the subject invention is adaptable to providing "amplitude weighting" of the decoded output signal to reduce the effect of reflecting sources at the ends of the effective pulse length range interval.

The selection of the type of code for pulse compression applications involves such considerations as maximizing range resolution (a large signal to sidelobe ratio) while at the same time keeping mechanization costs within reasonable limits. One code which may be readily encoded onto the transmitted signal and which has been demonstrated to provide adequate range resolution comprises N discrete phase states equally dividing 360° with a code length of $N^2$ (sometimes hereinafter referred to as the "Frank" code). The method and mechanization in accordance with the subject invention makes it possible to digitally decode the received reflected signals with accuracy, reliability and economy. It is to be noted that although the system of the invention is herein explained relative to the "Frank" code, the principles of the invention are equally applicable to other polyphase codes.

The "Frank" code is well documented in the literature in such references as the article in the October 1961 edition of the *IRE Transaction*, "Information Theory," pages 254 through 257, by R. C. Heimiller; and the article entitled "Polyphase Codes With Good Non-Periodic Correlation Properties" in the January 1963 issue of *Professional Group On Information Theory*, by R. L. Frank. Such a code of N discrete states and length $N^2$ may be defined by sequentially reading from left to right and top to bottom the phasors in the square matrix of N X N shown in Table II.

TABLE II

| | | | |
|---|---|---|---|
| $W^{0\cdot0}$ | $W^{0\cdot1}$ | $W^{0\cdot2}$ | $\ldots W^{0\cdot(N-1)}$ |
| $W^{1\cdot0}$ | $W^{1\cdot1}$ | $W^{1\cdot2}$ | $\ldots W^{1\cdot(N-1)}$ |
| . | | | |
| . | | | |
| . | | | |
| $W^{(N-1)\cdot0}$ | $W^{(N-1)\cdot1}$ | $W^{(N-1)\cdot2}$ | $\ldots W^{(N-1)\cdot(N-1)}$ |

In the matrix of Table II, $W = \exp(j\,2\pi/N)$ and the element in the *k*th row and the *p*th column is designated $W^{kp}$. The notation $\exp(j\,2\pi/N)$ designates that the constant $\epsilon$ is raised to the $j\,2\pi/N$ power where $j = \sqrt{-1}$. Hence, the notation $W^{kp}$ represents $\epsilon^{(j2\pi/N)kp}$ which is equal to the $\cos(2\pi/N)kp + j\sin(2\pi/N)kp$ and as will become apparent during the subsequent explanation of the mechanization of the subject invention multiplication by the last mentioned term is the same as a vector phase rotation of $(2\pi/N)kp$ degrees.

Without distracting from generality, it is perhaps clearer to explain the code matrix by way of an example for N = 8 illustrated in Table III.

TABLE III

Encoded Phase Shift in Degrees

| | | | | | | | |
|---|---|---|---|---|---|---|---|
| 0 | 0 | 0 | 0 | 0 | 0 | 0 | 0 |
| 0 | 45 | 90 | 135 | 180 | 225 | 270 | 315 |
| 0 | 90 | 180 | 270 | 0 | 90 | 180 | 270 |
| 0 | 135 | 270 | 45 | 180 | 315 | 90 | 225 |
| 0 | 180 | 0 | 180 | 0 | 180 | 0 | 180 |
| 0 | 225 | 90 | 315 | 180 | 45 | 270 | 135 |
| 0 | 270 | 180 | 90 | 0 | 270 | 180 | 90 |
| 0 | 315 | 270 | 225 | 180 | 135 | 90 | 45 |

Read from left to right and top to bottom Table III gives the relative phase shift encoded on the transmitted signal. To decode sequences or groups of signals which have previously been encoded by the polyphase function it is necessary to counterrotate the phase of the received signal elements by the same phase function (opposite direction of rotation) as was utilized during the encoding process. For example, in complex notation, a phase shift of 45° may be mechanized by a multiplication by the complex quantity $(1 + j)/\sqrt{2}$. To decode a signal element which had been encoded by the just mentioned 45° phase shift would require multiplication by the complex conjugate of the encoding function, i.e., $(1 - j)/\sqrt{2}$.

Consider now a signal S comprising a group of received signal elements of length $N^2$ which are enumerated by the notation $S_{kp+t}$ at a reference time *t*. The correlation function for a group of signal elements which had been encoded by the matrix shown in Table II may be expressed as Equation (1)

$$u_t = \sum_{k=0}^{N-1} u_{k,t}$$

where

Equation (2)

$$u_{k,t} = \sum_{p=0}^{N-1} W^{kp} S_{kn+p+t}$$

For the case of N = 8, the code matrix of the encoded phasors (phase rotation impressed on the transmitted signal) is given in Table III and the corresponding signal matrix in Table IV is for the first group of received signal elements at a time arbitrarily designated $t = 0$.

TABLE IV

Signal Matrix At $t = 0$

| | | |
|---|---|---|
| $S_0$ | $S_1$ | $S_2 \ldots S_7$ |
| $S_8$ | $S_9$ | $S_{10} \ldots S_{15}$ |
| $S_{16}$ | $S_{17}$ | $S_{18} \ldots S_{23}$ |
| . | | |
| . | | |
| . | | |
| $S_{56}$ | $S_{57}$ | $S_{58} \ldots S_{63}$ |

The signal elements for the next subsequent group of received signals to be decoded at the time period $t = 1$ are specified in Table V.

TABLE V

Signal Matrix At $t = 1$

| | | |
|---|---|---|
| $S_1$ | $S_2$ | $S_3 \ldots S_8$ |
| $S_9$ | $S_{10}$ | $S_{11} \ldots S_{16}$ |
| $S_{17}$ | $S_{18}$ | $S_{19} \ldots S_{24}$ |
| . | | |
| . | | |
| . | | |
| $S_{57}$ | $S_{58}$ | $S_{59} \ldots S_{64}$ |

It will be noted from Tables IV and V that the difference between the groups of subsequent encoded signal elements at the time $t = 0$ and $t = 1$ is the deletion of the signal designated $S_0$ and the addition of a new signal element designated $S_{64}$.

The decoding function indicated by Equation (1) may be mechanized as discussed relative to FIG. 2 by first multiplying each signal element of a particular group by the specified phase rotation and then adding each of the phase rotated signals. For a digital mechanization this approach would require $N^2$ complex multiplications and $N^2$ complex additions. By first summing the signal elements of each group requiring the same phase shift, the number of complex multiplications may be reduced to N, but $N^2$ complex additions would still be required. Since each group of received signal elements correspond to only one range interval for a typical radar application of $2^{10}$ range intervals, for example, $2^{18}$ or 262,144 complex additions would be required each transmission period for the relatively simple code having N = 8 discrete phase states. Also, the mechanization of the above mentioned technique would require a shift register having $N^2$ output terminals. In microminiature circuits the number of required output leads is a significant factor in determining the size and economy of the device, and a design which significantly reduces the number of output taps would enjoy an economic advantage due to that feature alone.

As will now be developed, the required number of complex additions is substantially reduced by the unique method and mechanization of the subject invention. It may be observed from Table II that the phase progression in the kth row is $W^k$ between successive matrix elements. $u_{k,t}$ and $u_{k,t+1}$ differ by the first and last elements in a row and a phase shift of $W^k$ for the remaining elements. This may be clarified by continuing the numerical example for the code N = 8, $$u_{0,t+1} = (u_{0,t} - S_0)\, W^0 + S_8\, W^0$$
$$u_{1,t+1} = (u_{1,t} - S_8)\, W^{-1} + S_{16}\, W^7$$
$$u_{2,t+1} = (u_{2,t} - S_{16})\, W^{-2} + S_{24}\, W^6$$

Eq. (3)

$$u_{6,t+1} = (u_{6,t} - S_{48})\, W^{-6} + S_{56}\, W^2$$
$$u_{7,t+1} = (u_{7,t} - S_{56})\, W^{-7} + S_{64}\, W^1$$

Since $W^k$ is equal to $W^{k-N}$ $$u_{0,t+1} = (u_{0,t} - S_0 + S_8)\, W^0$$
$$u_{1,t+1} = (u_{1,t} - S_8 + S_{16})\, W^{-1}$$
$$u_{2,t+1} = (u_{2,t} - S_{16} + S_{24})\, W^{-2}$$

Eq. (4)

$$u_{6,t+1} = (u_{6,t} - S_{48} + S_{56})\, W^{-6}$$
$$u_{7,t+1} = (u_{7,t} - S_{56} + S_{64})\, W^{-7}$$

As is evident from Equation (4) the number of required complex additions is reduced to 3N. For the application previously mentioned of 1,024 range intervals, the number of complex additions would be reduced from 262,144 to 49,152. It will also be evident that this principle is applicable to polyphase codes which may be represented by an N X N matrix of any N and is not limited to powers of 2.

Prior to a detailed description of one preferred embodiment of a decoder unit in accordance with the subject invention, a radar system suitable for transmitting a polyphase encoded signal in accordance with the invention and for receiving and processing the reflected return video signal groups in accordance with the invention will first be described.

Referring now primarily to FIG. 6 which shows the transmission and synchronization portion of such a radar system, a master oscillator 50 provides a high frequency signal at a frequency $f_1$ to a synchronization (sync) generator 52. Generator 52 which may comprise conventional differentiation and pulse shaping networks, provides a series of sync pulses (waveform 54 of FIG. 8) to a pulse counter 56. Counter 56 is coupled to a logic network 58 on composite lead 60. Network 58 includes suitable conventional logic circuits for providing enable signals to selected output leads during preselected counts of the counter 56.

Unless otherwise specified, it may be assumed that all the flip-flop circuits discussed herein are set by applying a 1 level logic signal (such an enable signal may be arbitrarily selected at a positive potential) to the J input terminal and are reset by applying a 1 level logic signal to the K input terminal. When a flip-flop circuit is in a set state, the Q output terminal is at the 1 logic level and when it is in the reset state the Q output terminal is at the 0 logic level (which may be arbitrarily selected as ground or reference potential).

After the counter 56 reaches its maximum count, for example 2048, it automatically resets to zero. Network 58 senses the zero count and applies an enable signal (1 level) to the J terminal of a control flip-flop 62. The Q output terminal of flip-flop 62 is coupled to a driver or power amplifier device 64. The device 64 may be any type of gated RF amplifier assembly and may include a cross field amplifier (CFA) or traveling wave tube (TWT). Device 64 is mechanized such that it is enabled (provides an RF output pulse) during the time period that the flip-flop 62 is in the set state.

For a code of N = 8 phase states, the code would comprise 64 elements with the respective phase rotation indicated in Table III above. Logic circuit 58 provides a 1 level signal to the K terminal of the flip-flop 62 when the counter 56 reaches the count of 63. Hence after 64 counts, the Q output terminal of the flip-flop 62 switches to the zero level and the driver 64 is disenabled (no output signal is generated).

The input signal to the driver unit 64, at a frequency $f_o$ is applied from the frequency multiplication unit 66 which unit "steps up" the frequency $f_1$ applied thereto from the master oscillator 50 (by the generation of harmonic frequencies in a nonlinear device and filtering, for example). A gated output signal at frequency $f_o$ (waveform 72 of FIG. 8) is applied to a phase shift network 70 on a lead 68 during the time period that flip-flop 62 is set, i.e. for the first 64 synchronization time periods out of every 2,048 sync periods, for example.

The phase shift network 70 is controlled in response to the logic network 58 to encode the RF pulses 72 in accordance with the polyphase code specified in Table III. Logic network 58 may comprise conventional gate circuits for sensing each count from 0 through 63 and for enabling the proper combination of phase shifter on each count. For the code of Table III, the required phase shifts may be mechanized with three phase shift units 74, 76 and 78. These units could comprise RF waveguide sections with diodes or varactor coupled thereacross so that the specified phase shift is added when an enabling signal is applied to the respective units. For example, the unit 74 will provide a 45° phase shift when enabled and a zero degree phase shift when disenabled. It is noted that for the polyphase code of Table III that the required phase shifts are obtained by the proper combination of only three phase shift units. For example, a 315° phase shift may be obtained by enabling all three of the units, while 225° is provided by units 74 and 78 and 135° by units 74 and 76.

The phase modulated output signal from the phase shift unit 70 is amplified in final RF amplifier stage 80, which may include a CFA or TWT, for example, to the final power level and it then coupled through duplexer unit 82 to transmission and reception antenna 20.

Referring now primarily to FIG. 7 the RF energy received from reflectors within the antenna pattern 22 (FIG. 1) is applied from antenna 20 through duplexer 82 to a mixer 84. The RF reference signal to the mixer 84 is applied thereto from a stable local oscillator 86, and the mixer translates the received RF energy to the intermediate (IF) frequency band. The output signal from the mixer 84 is applied to and amplified by IF amplier 88.

The output signal from amplifer 88 is phase detected against an intermediate frequency signal from reference oscillator 90 in a phase detector 92. If the received input signal from the phase detector 92 is represented by a vector of length A with a phase B relative to the phase of the signal applied from oscillator 90 (arbitrarily established phase standard), then the output of detector 92 may be represented by the quantity A cos B which is sometimes hereinafter designated "I" for inphase received video.

Similarly, the signal from IF amplifier 88 is applied to a quadrature phase detector 94. The reference signal from oscillator 90 after being phase shifted 90° by phase shifter 96, is applied as the reference signal to the phase detector 94. Hence, the output signal of detector 94 is translated 90 degrees from that of detector 92 and may be represented by the quantity A sin B — which quantity is sometimes hereinafter designated "Q" for received quadrature video.

Numerous considerations determine the length of the range zone to be examined by the processing sections of the receiver. For example, the height of the antenna, the antenna pattern and look-down angle control which range zones are illuminated by the energy transmitted. Herein it is arbitrarily assumed that the interpulse period T (see FIG. 8) is subdivided into 2,048 range intervals and that the range zone to be examined by the processing portion of the system is the center 512 range intervals of each transmission period.

A minimum/maximum range gate (waveform 99 of FIG. 8) which is at the 1 level between the minimum and maximum ranges of interest, is generated by a flip-flop 98 (FIG. 6) in response to enabling signals applied from logic network 58. For example, if the J terminal of flip-flop 98 is enabled when counter 56 reaches a count of 768 and the K terminal enabled at the count of 1,280 then 512 range resolution cells would be included within the range zone of interest.

Upon the application of sync pulses during the minimum/maximum range gate period (sampling periods), analog to digital converter units 100 and 102 sample the inphase and quadrature video signals respectively applied thereto from detectors 92 and 94. Units 100 and 102 convert video signals to digital words of the desired precision, e.g., each word could comprise 8 bits including a sign bit. The minimum/maximum range gate signal is combined with the sync pulses (waveform 54) in an AND gate 104 (FIG. 6) and the output signal of this gate (sampling pulses) is applied to converters 100 and 102 for synchronization thereof.

The digital words representative of the digital value of the inphase and quadrature signals are applied from the converter units on composite leads 105 and 106 respectively to buffer storage units 108 and 110. The inphase and quadrature binary words are shifted out of the buffer units 108 and 110 to decoder unit 112 on composite leads 114 and 116 respectively in response to shift signals applied to the buffer storage units from the decoder unit.

For the illustrated example incorporation of the buffer storage units allows the decoding unit 112 to operate at a reduced processing rate. However, it will be understood that in applications where processing times are not a factor these buffers may be eliminated and the decoding unit operated at the sampling rate. In the illustrated embodiment data is stored in the buffer storage units under the control of the sampling pulses from AND gate 104 during the minimum/maximum range gate periods and retrieval of data is controlled by the decoder 112 during the interpulse period exclusive of the minimum/maximum range period.

One preferred embodiment of the decoding unit 112 which exhibits the aforementioned advantages of reliability and reduction in the number of required arithmetic operations is shown in block diagram form in FIG. 9. As there shown, the unit 112 comprises an input subtracter network 134 and eight processing subsections identified by reference numerals 122 through 129 inclusively. Units 126 through 129, shown in block diagram form, are structurally identical to units 122 through 125. All of the elements shown in FIG. 9 are dual parallel channel devices for separately processing the inphase and quadrature signals and all of the connecting leads are composite leads (for example, comprising 16 individual leads with eight for each inphase and each quadrature word respectively).

The subtraction network 134 and the first processing subsection 122 are shown in greater detail in FIG. 10. Due to the similarity between the processing subsections it will be readily apparent that the remaining sections shown in FIG. 9 may be mechanized in a similar fashion. In FIG. 10 each channel of the dual channel processing elements is designated by the same reference number as the corresponding unit shown in composite form in FIG. 9 except that the reference numeral associated with the inphase and quadrature signal processing channels are followed by I and Q respectively.

Referring momentarily to FIG. 10 a clock generator unit 130 generates timing pulses such that data from the required number of range intervals (for example, 512 range interval per interpulse period) are processed during each processing period (PI) (see waveform 133 of FIG. 8). The pulses from clock generator 130 are combined in AND gate 135 with the Q output pulses of flip-flop 98 (FIG. 6) to provide gated clock pulses *c* to all units of FIGS. 9 and 10 except the fixed registers. As shown in waveform 133 of FIG. 8, the processing time period (PI) is the complement of the storage period defined by the minimum/maximum range gate (waveform 99).

Output signals from the generator 130 are also applied to buffer units 108 and 110 (FIG. 7) to initiate the shifting of the next word from these units to inphase and quadrature shift registers 132I and 132Q and into subtracter units 134I and 134Q respectively. The output from the register 132 is applied to the subtrahend input of the subtracter unit 134 and the inphase and quadrature terms of the remainder applied to full adders 138I and 138Q respectively. The inphase and quadrature remainder words from the subtracter 134 are summed in full adders 138I and 138Q respectively with the output of complex multiplier units 140I and 140Q respectively. Multipliers 140 form the vector product of a vector quantity stored in inphase and quadrature storage registers 142I and 142Q with the vector quantity supplied from the fixed content register 144.

The operation of the complex multiplier units may be explained by first recalling that the product of two complex numbers $S_{144I}+j\,S_{144Q}$ and $S_{142I}+j\,S_{142Q}$ is $S_{144I}\,S_{142I}-S_{144Q}\,S_{142Q}+j\,(S_{144Q}\,S_{142I}+S_{144I}\,S_{142Q})$ where $S_{144I}$ and $S_{144Q}$ are the inphase and quadrature component terms applied from register 144; $S_{142I}$ and $S_{142Q}$ are the inphase and quadrature terms of the vector quantity stored in register 142; and $(S_{144I}\,S_{142I}-S_{144Q}\,S_{142Q})$; and $(S_{144Q}\,S_{142I}+S_{144I}\,S_{142Q})$ are the inphase and quadratrue terms respectively of the complex product applied to the output leads 146I and 146Q respectively. Multipliers 140I and 140Q may be mechanized as indicated in the block diagram of FIGS. 11 and 12 respectively.

As shown in FIG. 11 multiplier units 146 and 148 which may be conventional digital multipliers, form the terms $S_{144I}\,S_{142I}$ and $S_{144Q}\,S_{142Q}$ respectively and the latter term is subtracted from the former term in a subtraction unit 150 to form the inphase term of the complex product. Similarly, as shown in FIG. 12, multiplier units 152 and 154 form the terms $S_{144Q}\,S_{142I}$ and $S_{144I}\,S_{142Q}$ respectively and these terms are combined in adder 156 to form the quadrature term of the complex product.

Referring again primarily to FIG. 10, the inphase and quadrature product terms from multiplier 140I and 140Q are applied to adders 138I and 138Q respectively and to complex adder 158 (FIG. 9). The output signal of the complex adder 138 is stored in register 142 for use during the next processing cycle. Register 142 and the corresponding registers in subsections 123 through 129 are reset by a signal R applied from the logic network 58 (FIG. 6) at the count of 1,024 — i.e., prior to the start of each processing cycle the registers are cleared.

Each of the N processing subsections (N = 8 in the illustrated embodiment) 122 through 129 are separated by dual channel shift registers 160 through 166 inclusive.

The output signal of register 160 drives processing subsection 123 and the elements of processing subsection 123 are labeled with the same reference number as the corresponding element of section 122 with the addition of the letter *a* following the reference number. The output signal (product term) from multiplier **140*a* is applied as one of the component input signals to complex adder 158. Complex adder 158** may comprise dual channel conventional full adders with one channel processing the inphase term and the other channel the quadrature term.

Similarly, register 161 drives processor subsection 124 and the elements comprising subsection 124 are designated by the same reference numeral as the corresponding elements in subsection 122 with the addition of the latter *b* following the reference numeral. The output signal from the multiplier **140*b* is applied as one input signal of a complex adder 167**.

The output signal from the shift register 162 is applied to subsection 125 wherein the component elements are identified by the letter *c* and the output signal (product term) from the multiplier **140*c* is combined in complex adder 167 with the output signal from subsection unit 124**.

In a like manner subsection units 126 and 127 are driven by output signals from registers 163 and 164 respectively and contain elements identical to the other subsections and are identified by reference letter *d* and *e* respectively. The product term generated by the multiplication elements within these subsections (not shown) are combined in complex adder 171. Subsection units 128 and 129 are identical in structure to the other subsection and the elements are identified by reference letters *f* and *g* respectively. Units 128 and 129 are coupled to the output terminals of registers 165 and 166 respectively and the output signals from these subsections are combined in adder 173.

The sum output signal from adders 158 and 167 are combined in adder 169. The sum output signal from adders 171 and 173 are combined in adder 175 and the sum of the output signals of adders 169 and 175 are formed in adder 177. The just mentioned adder units are all dual channel devices with one channel for processing inphase signals and another channel for processing quadrature signals.

Adder 177 sequentially forms the decoded valve of each range interval within the minimum/maximum range gate, and these signals are applied to a three-stage shift register 172 shown in FIG. 13. Referring momentarily to FIG. 13, a subtractor network 174, which comprises subtraction devices 176 and 178, is coupled to the register 172 such that the two outside stages of the register are connected to the network 174 with a one bit shift to the right — a divide by 2 operation in binary arithmetic. This just described shift of the leading and lagging decoded signal values (range intervals preceding and following the range interval being processed) is equivalent to a weighting factor of one-half and operates to suppress sidelobe energy — i.e., the relative suppression of the energy due to reflecting sources in other than the decoded range interval. The just described weighting function mechanization was selected because of economy of implementation and because for the illustrated embodiment a weighting function of 0.5 provides an acceptable enhancement in the signal to sidelobe energy ratio. However, it will be understood that other weighting functions may be utilized in the subject invention. For example, division units may be incorporated between the first and last stages of the register 172 and their associated subtracters respectively; or a multiplier unit may be added between the central stage of register 172 and subtracter 176.

As will become clear during the summary of the operation of the subject invention, $N^2$ processing cycles are required to produce the output signal representative of the decoded value of the first range interval. With the circuit shown in FIG. 13 the weighted output signal is not gated to the utilization device (not shown) until three operating cycles after the first range interval has been decoded. This is mechanized by coupling the output signals from subtracter 178 (the decoded weighted output signals) through an output gate 180 which is controlled by a gate control signal (waveform 181 and FIG. 8) applied from the Q output terminal of a flip-flop 182. Flip-flop 182 is set at a preselected count, for example, at the count of 67 clock pulses ($N^2$ + 3 pulses) after the reset pulse. Logic circuit 184 senses when the last mentioned count has been reached in counter 186 at which time a set signal is applied from circuit 184 to the J input terminal of the flip-flop 182. Both the counter 186 and the flip-flop 182 are reset by the R signal provided from circuit 58 (FIG. 6) before the start of each processor cycle. Hence, gate 180 gates through the output signals from the unit 178 after the processor has stabilized its operation.

OPERATION

In the operation of the subject invention, the transmitter unit shown in FIG. 6 transmits a series of RF energy pulses at a pulse repetition rate 1/T (waveform 72 of FIG. 8). Each of the transmitted pulses is encoded by an N state polyphase code comprising $N^2$ encoded elements (see FIG. 3). Encoding of the transmitted pulses is provided by phase shifter unit 70 which is controlled by logic network 58. For a code having N = 8 phase states, logic network 58 would sense counts 0 through 63 of the counter 56 and activate the proper combination of phase shift units so that the phase shifts listed in Table III, for the example of N =8, are encoded on the transmitted signal.

During the time period between energy pulses, reflections from objects within the antenna beam pattern 22 are received by the receiver unit of FIG. 7. It is noted that each reflector which is illuminated will return a polyphase encoded signal of length $N^2$ and where the spacing between reflecting sources is less than the length of the transmitted pulse the return from contiguous reflectors will be in time coincidence.

The minimum/maximum range gate (waveform 99 of FIG. 8) is combined with the sync pulses (waveform 54) in the AND gate 104 to produce sampling pulses which control the operation of the inphase and quadrature channels of A/D converters 100 and 102 and the storage of data in buffer units 108 and 110. If 512 samples, for example, are stored in the buffer units during each interpulse period (as mechanized in the disclosed embodiment) then these elements of data may be designated $S_0$, $S_1$, $S_2$ . . . through $S_{511}$ with the signal elements $S_0$ through $S_{63}$ representing the first received encoded signal group, $S_1$ through $S_{64}$ the second received encoded signal group, $S_2$ through $S_{65}$ the third group and so on with $S_{448}$ through $S_{511}$ being the last group of signal elements to be decoded during a particular interpulse period.

The data stored in the buffer units during the minimum/maximum range gate interval is shifted into the decoding unit 112 one word at a time during the processor interval (waveform 133 of FIG. 8) in response to clock pulses provided by gate 135 (FIG. 10).

Considering the operation of the decoding unit 112 (FIG. 9) at a time $t$ following the 64th clock pulse from gate 135 during any processing interval (interpulse period), the first signal group $S_0$ through $S_{63}$ is processed to produce sub-accumulator signals $u_{o,t}$ through $u_{7,t}$ at the output of respective multipliers 140 and 140$a$ through 140$g$. The sum of these signals, $u_{0,t}$ through $u_{7,t}$, is equal to the decoded value of signal group $S_0$ through $S_{63}$ (first range interval). It is noted that at the start of each processing interval, $N^2$ (64 in the present example) processing cycles (clock pulses from gate 135) are required to produce the output signal representative of the decoded value of the first range interval; but output signals equal to the decoded value of subsequent range intervals are produced each successive processing clock pulse interval.

Equation (3) indicates the basic format of recursive operation whereby the full $N^2$ signal elements of a group of encoded signal elements are subdivided into N subgroups. For the illustrated embodiment of N = 8, there are eight subgroups of terms and the total of the $u$'s (sub-accumulation signals) on the left-hand side of Equation (3) equals the decoded output signal value for the group of signal elements being processed during the time period $t + 1$ in terms of the $u$ terms (sub-accumulation signals) formed during the preceding time period $t$.

In the decoding unit 112 shown in FIG. 9, instead of applying the required phase shift to each data element individually at each time step, the complexity and cost of the decoding unit are greatly reduced by applying the required phase shift to the modified sub-accumulation signals from each subsection. The modification of the sub-accumulation signals from the last processed group compensates for a new entry (encoded signal element) at one end and the exit of the oldest entry at the other end of each subsection.

The input stage of unit 112 which comprises shift register 132 and the subtraction unit 134, simplifies the required processing by forming the difference between elements displaced by N time steps ($S_t - S_{t-8}$). For example, at time $t + 1$ the S signal pairs of Equation (4), $S_8 - S_0$, $S_{16} - S_8$, $S_{24} - S_{16}$ . . . $S_{64} - S_{56}$ had been formed in the input stage and are stored in the stages of shift register sections 160 through 166. It is noted that although for clarity of description shift registers sections 132 and 160 through 166 are shown in FIG. 9, as separate devices, they may be mechanized by a single shift register of $N^2$ stages having N output terminals. Table VI lists in terms of Equation (4) the signal values formed in the output sections of the major circuits of FIG. 9 and Table VII lists the phase shift coefficients stored in registers **144, 144*a*, 144*b*, 144 *c* . . . 144*g*.**

TABLE VI

| Signal | Reference Number of Circuit |
|---|---|
| $S_{64} - S_{56}$ | **134** |
| $S_{56} - S_{48}$ | **160** |
| $S_{48} - S_{40}$ | **161** |
| $S_{32} - S_{24}$ | **162** |
| $S_{46} - S_{32}$ | **163** |
| $S_{32} - S_{24}$ | **164** |
| $S_{16} - S_8$ | **165** |
| $S_8 - S_0$ | **166** |
| $u_{7,t}$ | **140** |
| $u_{6,t}$ | **140*a*** |
| $u_{5,t}$ | **140*b*** |
| $u_{4,t}$ | **140*c*** |
| $u_{3,t}$ | **140*d*** |
| $u_{2,t}$ | **140*e*** |
| $u_{1,t}$ | **140*f*** |
| $u_{0,t}$ | **140*g*** |
| $u_{7,t} - S_{56} + S_{64}$ | **138** |
| $u_{6,t} - S_{48} + S_{56}$ | **138*a*** |
| $u_{5,t} - S_{40} + S_{48}$ | **138*b*** |
| $u_{4,t} - S_{32} + S_{40}$ | **138*c*** |
| $u_{3,t} - S_{24} + S_{32}$ | **138*d*** |
| $u_{2,t} - S_{16} + S_{24}$ | **138*e*** |
| $u_{1,t} - S_8 + S_{16}$ | **138*f*** |
| $u_{0,t} - S_0 + S_8$ | **138*g*** |

TABLE VII

| Register Reference Numeral | Phase Shift Coefficients |
|---|---|
| **144** | exp-$j$315 = $1+j/\sqrt{2}$ |
| **144*a*** | exp-$j$270 = $0+j1$ |
| **144*b*** | exp-$j$225 = $-1+j/\sqrt{2}$ |
| **144*c*** | exp-$j$180 = $-1+j0$ |
| **144*d*** | exp-$j$135 = $-1-j/\sqrt{2}$ |
| **144*e*** | exp-$j$90 = $0-j1$ |
| **144*f*** | exp-$j$45 = $1-j/\sqrt{2}$ |
| **144*g*** | exp-$j$0 = $1+j0$ |

For example, subtracter 134 forms the quantity $S_{64} - S_{56}$ and the output signal from multiplier 140 is $u_{7,t}$. Hence, the adder 138 forms the term $u_{7,t} - S_{56} + S_{64}$ (a modified sub-accumulation signal) corresponding to the term in the brackets in the last row of Equation (4); and adders **138*a*, 138*b* . . . 138*g* form similar terms. These modified subaccumulation signals are held in accumulator registers 142, 142*a*, 142*b* . . . 142*g* for one time step. It is noted that multipliers 140, 140*a*, 140*b* . . . 140*g*** form the vector products between the values held in corresponding accumulator registers and the phase shift coefficients applied from the associated fixed registers.

At the next time step (processor clock pulse) Equation (4) is completed to give the term $u_{7,t+1}$ (new subaccumulation signal) at the output of multiplier 140 and terms $u_{6,t+1}$; $u_{5,t+1}$ . . . $u_{0,t+1}$ at the outputs of units **140*a*, 140*b* . . . 140*g* respectively. The $u_{t+1}$ signals are combined in vectorial adders 158, 167, 169, 171, 173, 175 and 177** to form the decoded signal value for the range interval being examined during the processing time period designated $t + 1$, and are also stored in the respective associated accumulator registers — i.e., the accumulator registers are updated by the new set of modified sub-accumulation signals.

The output signal for processing time $t + 1$ is stored in register 172 (FIG. 12) and during the next processing cycle one-half the value of the decoded signals from processing time period $t$ and $t + 2$ is subtracted therefrom. The decoded weighted output signal is applied to the gate 180 and when gate 180 is enabled the weighted signals are applied to an output utilization device (not shown) such as a train display unit.

FIG. 14 shows a second preferred embodiment of the subject invention wherein the difference signals for encoded signal elements displaced by N processing time steps ($S_t - S_{t-N}$, see Equation 4) are developed in each of the subsections instead of with a single subtracter unit 134 in the embodiment of FIG. 9. Referring momentarily to FIG. 14, a shift register 200 has $N^2$ stages with output terminals (taps) every N stage. Different ones of the plurality of sub-accumulation signals are formed in processing subsections 202 through 209 and as described previously relative to the embodiment of FIG. 9 these sub-accumulation signals are combined in adders 158, 167, 171, 173, 169, 175 and 177 to form the decoded output signal.

Processing subsections 202 through 209 are structurally and functionally identical so that only one section 202 need be shown or described in detail. For the case of N = 8, section 202 would mechanize the last row of Equation (4) and the embodiment of FIG. 14 may be best explained by reference to this mechanization. Assuming that the sub-accumulation signal $u_{7,t}$ was formed during a previous processing cycle designated $t$, and is stored in a register 212, during the next processing cycle designated $t + 1$, the encoded signal element $S_{56}$ is subtracted from $u_{7,t}$ in subtracter 214 during one portion of a subprocessing time interval; the term $S_{64}$ is added to the remainder therefrom in an adder 216 during the next subprocessing time interval and multiplier unit 218 applies the phase shift $W^{-7}$ to the modified sub-accumulation signal thereby forming the new sub-accumulation signal $u_{7,t+1}$. In a similar manner processing subsections 203 through 209 mechanize terms $u_{6,t+1}$ through $u_{0,t+1}$, respectively.

All of the elements shown in FIG. 14 are dual parallel channel devices for separately processing the inphase and quadrature signals applied from the buffer units of FIG. 2 and all of the connecting leads are composite leads (e.g., perhaps comprising 16 individual leads with eight for each inphase and each quadrature word respectively). Also, all units are synchronized by gated clock pulses in a manner similar to that described for the mechanization of FIG. 9.

It is understood that many changes and/or modifications may be made to the embodiments described herein without departing from the scope of the subject invention. For example, for certain values of phase shift such as 0°, ±90, 180° and 360° the fixed registers such as **144*a* (FIG.9) and the complex multipliers such as 140*a* may be eliminated and the output of the storage register such as 142*a* wired directly to the associated units, such as adders 138*a* and 158a. In the illustrated embodiments, in the interest of describing the general case for a code of N phase states, multiplication units have been shown in all subsections. However, for the case of N = 8 the multiplication operation indicated by certain of the coefficients of Table VII may be performed without the use of multiplication units. For example, the phase rotation required within subsection 123 may be performed by interchanging the inphase and quadrature output signals of register 142***a* after inverting the sign bit of the quadrature signal. The phase shift required within subsection 125 may be mechanized by simply inverting the sign bit of both the inphase and quadrature signals from register 142*c*. For subsection 127 the indicated multiplication may be implemented by interchanging the inphase and quadrature output signals of register 142*e* after inverting the sign bit of the inphase term; and the output of the register 142*g* may be wired directly to the associated adder units.

What is claimed is:

1. A device for consecutively decoding groups of sequentially applied encoded signals having $N^2$ signals of N phase encoded states in each group, said device comprising:

first means for storing N modified sub-accumulation signals;

second means for adjusting the phase of said N modified sub-accumulation signals to form N sub-accumulation signals the sum of which approximates the decoded value of a particular group of encoded signals;

third means for modifying said N sub-accumulation signals as a function of the difference between said particular group of encoded signals and the next group, said third means including means for summing the N sub-accumulation signals associated with each group to form signals substantially equal to the decoded value of the corresponding group of encoded signals; and means for updating said first means to store therein said new set of modified sub-accumulation signals.

2. The device of claim 1 further comprising:

means for storing the decoded value of a number of consecutively decoded signal groups;

means for modifying the value of the some of said stored groups by predetermined constant values; and means for subtracting the modified stored decoded values forom one of the other stored unmodified decoded values.

3. A device for consecutively decoding groups of sequentially applied encoded signals having $N^2$ signals of N phase encoded states in each group, said device comprising:

first means for storing N modified sub-accumulation signals;

second means for adjusting the phase of said N modified sub-accumulation signals to form N sub-accumulation signals the sum of which approximates the decoded value of a particular group of encoded signals;

third means for modifying said N sub-accumulation signals as a function of the difference between said particular group of encoded signals and the next group, said third means including means for adding selected encoded signals to and subtracting different selected encoded signals from each of said N sub-accumulation signals such that each sub-accumulation signal is modified by a different pair of said selected signals; and means for updating said first means to store therein said new set of modified sub-accumulation signals.

4. The device of claim 3 wherein said third means further includes means for selecting the encoded signals added to and subtracted from said N sub-accumulation signals such that the signals added to an subtracted from each N sub-accumulation signal are displaced N signal positions in the sequence of encoded applied signals.

5. A device for consecutively decoding groups of sequentially applied encoded signals having $N^2$ signals of N phase encoded states in each group, said device comprising:

first means for storing N modified sub-accumulation signals;

second means for adjusting the phase of said N modified sub-accumulation signals to form N sub-accumulation signals the sum of which approximates the decoded value of a particular group of encoded signals, said second means including means for forming the vector product between said modified N sub-accumulation signals and N preselected values, respectively;

third means for modifying said N sub-accumulation signals as a function of the difference between said particular group of encoded signals and the next group; and means for updating said first means to store therein said new set of modified sub-accumulation signals.

6. The device of claim 5 wherein said N modified sub-accumulation signals each have an inphase component and a quadrature component, and said second means includes dual channel multiplication units with each channel having preselected fixed multiplier quantity associated therewith.

7. A device for consecutively decoding groups of sequentially applied encoded signals having $N^2$ signals of N phase encoded states in each group, said device comprising:

first means for storing N modified sub-accumulation signals;

second means for adjusting the phase of said N modified sub-accumulation signals to form N sub-accumulation signals the sum of which approximates the decoded value of a particular group of encoded signals;

third means for modifying said N sub-accumulation signals as a function of the difference between said particular group of encoded signals and the next group, said third means including N delay devices, a subtraction device having minuend and subtrahend inputs and having an output, means for applying said sequentially applied encoded signals to the minuend input of said subtraction device and to the input of a first one of said N delay lines, means for coupling the output of said first delay device to the subtrahend input of said subtraction device, means for coupling the output of said subtraction device to a second one of said N delay devices, means for coupling the second through the Nth said delay devices in series, and means for summing the N sub-accumulation signals from said second means with the output signal of said subtraction device and with said output signals of the second through said Nth delay devices, respectively; and means for updating said first means to store therein said new set of modified sub-accumulation signals.

8. The device of claim 7 wherein each said delay device includes an N stage shift register.

9. The device of claim 7 wherein said N delay devices comprise an $N^2$ stage shift register with output terminals every N stage.

10. The device of claim 7 wherein each said sequentially applied encoded signal has an inphase component and a quadrature component and each said delay device includes a separate N stage shift register for the inphase and quadrature components, respectively.

11. The device of claim 10 wherein said subtraction device and said means for summing each includes separate processing channels for both the inphase and the quadrature components.

12. A device for consecutively decoding groups of sequentially applied encoded signals having $N^2$ signals of N phase encoded states in each group, wherein a group $t+1$ of said encoded signals differs from a preceding group t by the absence of a signal $S_0$ at one end of the $t$ group and the addition of a new signal $S_{N_2}$ to the other end of the $t$ group, said device comprising:

first means for storing N modified sub-accumulation signals;

second means for adjusting the phase of said N modified sub-accumulation signals to form N sub-accumulation signals the sum of which approximates the decoded value of a particular group of encoded signals;

third means for modifying said N sub-accumulation signals as a function of the difference between said particular groups of encoded signals and the next group, said third means includes means for modifying each sub-accumulation signal associated with group t as follows:

add $(-S_0 + S_N)$ to $u_{0,t}$
add $(-S_n + S_{2N})$ to $u_{1,t}$
add $(-S_{2N} + S_{3N})$ to $u_{2,t}$
.
.
.
add $(-S_{(N-1)N} + S_{N_2})$ to $u_{N-1,t}$; where said N sub-accumulation signals associated with group $t$ are designated $u_{0,t}$; $u_{1,t}$; $u_{2,t}$; . . . $u_{N-1,t}$; and said signals comprising said encoded group at time $t+1$ are designated $S_1, S_2, S_3 \ldots S_{N_2}$, means for updating said first means to store therein said new set of modified sub-accumulation signals.

13. The device of claim 12 wherein said second means includes means for phase rotating said modified sub-accumulation signals by the following indicated quantity;

$(u_{0,t} - S_0 + S_n)$ by exp-0$(j\ 2\pi/N)$
$(u_{1,t} - S_N + S_{2N})$ by exp-1$(j\ 2\pi/N)$
$(u_{2,t} - S_{2N} + S_{3N})$ by exp-2$(j\ 2\pi/N)$
.
.
.
$(u_{N-1,t} - S_{(N-1)N} + S_{N_2})$ by expo-$(N-1)\ (j2\pi/N)$
where the notation "exp" indicates the constant $\epsilon$ raised to the power of the expression following said notation.

14. A method for consecutively decoding groups of sequentially applied signals having $N^2$ signals of N phase encoded stated in each group, with each group differing from the preceding group by the addition of a new encoded signal to one end of the group and the deletion of a signal from the other end of the group, said method comprising the steps of:

storing N modified sub-accumulation signals from the last preceding processing cycle;

adjusting the phase of said N modified sub-accumulation signals to form N sub-accumulation signals the sum of which approximates the decoded value of a particular group of encoded signals;

summing the N sub-accumulation signals associated with each group to form signals substantially equal to the decoded value of the corresponding group of encoded signals;

modifying said N sub-accumulation signals as a function of the difference between said particular group of encoded signals and the next group; and storing said new set of modified sub-accumulation signals.

15. A method for consecutively decoding groups of sequentially applied signals having $N^2$ signals of N phase encoded states in each group, with each group differing from the preceding group by the addition of a new encoded signal to one end of the group and the deletion of a signal from the other end of the group, said method comprising the steps of:

storing N modified sub-accumulation signals from the last preceding processing cycle;

adjusting the phase of said N modified sub-accumulation signals to form N sub-accumulation signals the sum of which approximates the decoded value of a particular group of encoded signals;

modifying said N sub-accumulation signals as a function of the difference between said particular group of encoded signals and the next group, with said modifying step including adding selected encoded signals to and subtracting different selected signals from each of said N sub-accumulation signals such that each sub-accumulation signal is modified by a different pair of said selected signals; and storing said new set of modified sub-accumulation signals.

16. The method of claim 15 wherein said modifying step further includes selecting the encoded signals added to and subtracted from said N sub-accumulation signals such that the signals added and subtracted from each N sub-accumulation signal are displaced N signal positions in the sequence of encoded applied signals.

17. A method for consecutively decoding groups of sequentially applied signals having $N^2$ signals of N phase encoded states in each group, with each group differing from the preceding group by the addition of a new encoded signal to one end of the group and the deletion of a signal from the other end of the group, said method comprising the steps of:

storing N modified sub-accumulation signals from thel last preceding processing cycle;

adjusting the phase of said N modified sub-accumulation signals to form N sub-accumulation signals the sum of which approximates the decoded value of a particular group of encoded signals, with said phase adjusting step including forming the vector product between said modified N sub-accumulation signals and N preselected values, respectively;

modifying said N sub-accumulation signals as a function of the difference between said particular group of encoded signals and the next group; and storing said new set of modified sub-accumulation signals.

18. A device for consecutively decoding groups of sequentially applied phase encoded signals, said device comprising;

means for storing a plurality of sub-accumulation signals the sum of which approximates the decoded value of a particular group of said encoded signal;

means for modifying said plurality of stored sub-accumulation signals as a function of the difference between said particular group of encoded signals and the next group to form a plurality of new sub-accumulation signals with said means for modifying including means for adding a signal to and subtracting a signal from each of said stored signals to provide a plurality of modified sub-accumulation signals, and means for adjusting the phase of each of said modified sub-accumulation signals as a function of phase encoded onto said sequentially applied phase encoded signals; and means for applying said new set of sub-accumulation signals to said means for storing.

19. A pulse compression system comprising:

means for transmitting phase encoded pulses of energy;

means for receiving energy reflected in response to said transmitted encoded pulses, means for sequentially processing said received energy to form a pluraltiy of sub-accumulation signals the sum of which approximates the compressed value of the received energy from a particular range interval and means for modifying said plurality of accumulation signals associated with said particular range interval to form another set of sub-accumulation signals the sum of which approximates the reflected energy received from the next range interval.

20. The system of claim 19 wherein:

said transmitting means includes means for encoding N phase states onto each transmitted signal;

said processing means includes storage means for storing N sub-accumulation signals; and said modifying means includes means for modifying each said stored signal as a function of the difference between said signals associated with a particular range interval and the next range interval.

21. The device of claim 20 wherein said modifying means includes means for adding a signal to and subtracting a signal from each of said stored signals to provide N modified sub-accumulation signals, and means for adjusting the phase of each of said modified sub-accumulation signals as a function of said encoded phase states.

* * * * *